(12) United States Patent
Kondo et al.

(10) Patent No.: US 12,370,877 B2
(45) Date of Patent: Jul. 29, 2025

(54) LIQUID-FILLED VIBRATION DAMPING DEVICE

(71) Applicant: SUMITOMO RIKO COMPANY LIMITED, Komaki (JP)

(72) Inventors: Hiroki Kondo, Komaki (JP); Kenji Oki, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 418 days.

(21) Appl. No.: 18/165,514

(22) Filed: Feb. 7, 2023

(65) Prior Publication Data

US 2023/0271493 A1 Aug. 31, 2023

(30) Foreign Application Priority Data

Feb. 25, 2022 (JP) .................................. 2022-027816

(51) Int. Cl.
*B60K 5/12* (2006.01)
(52) U.S. Cl.
CPC .................................. *B60K 5/1208* (2013.01)
(58) Field of Classification Search
CPC ...... B60K 5/1208; F16F 13/103; F16F 15/08; F16J 15/104
See application file for complete search history.

(56) References Cited

U.S. PATENT DOCUMENTS

| | | | |
|---|---|---|---|
| 9,593,732 B2 | 3/2017 | Thierry et al. | |
| 9,931,923 B2 | 4/2018 | Oki et al. | |
| 11,454,295 B2* | 9/2022 | Kondo | B60K 5/12 |
| 2017/0122398 A1* | 5/2017 | Michiyama | F16F 13/10 |
| 2023/0272836 A1* | 8/2023 | Kondo | F16F 13/108 |

FOREIGN PATENT DOCUMENTS

| | | |
|---|---|---|
| JP | 2016-180471 A | 10/2016 |
| JP | 6808554 B2 | 1/2021 |

* cited by examiner

*Primary Examiner* — Pamela Rodriguez
(74) *Attorney, Agent, or Firm* — Oliff PLC

(57) ABSTRACT

A liquid-filled vibration damping device including a main unit and a bracket, the main unit including first and second attachments connected by a rubber body, and a closure member locked to the second attachment from below with a seal member sandwiched therebetween to seal a liquid chamber. The second attachment includes a pair of metallic connectors inserted into a pair of metallic grooves of the bracket. The metal is exposed on lower faces of the connectors which are pressed against groove-inside lower faces of the grooves in metal-to-metal contact. Convex parts protruding downward are provided at far-side ends of the connectors while concave parts are provided on the grooves at locations corresponding to the convex parts. Detent engagers preventing dislodgment of the connectors inserted in the grooves are constituted in metal-to-metal contact by the convex parts entering the concave parts to be engaged.

7 Claims, 11 Drawing Sheets

FIG.17A
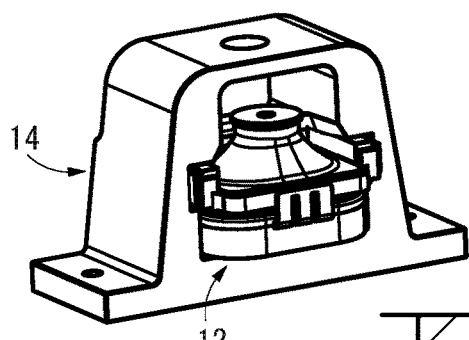
FIG.17B
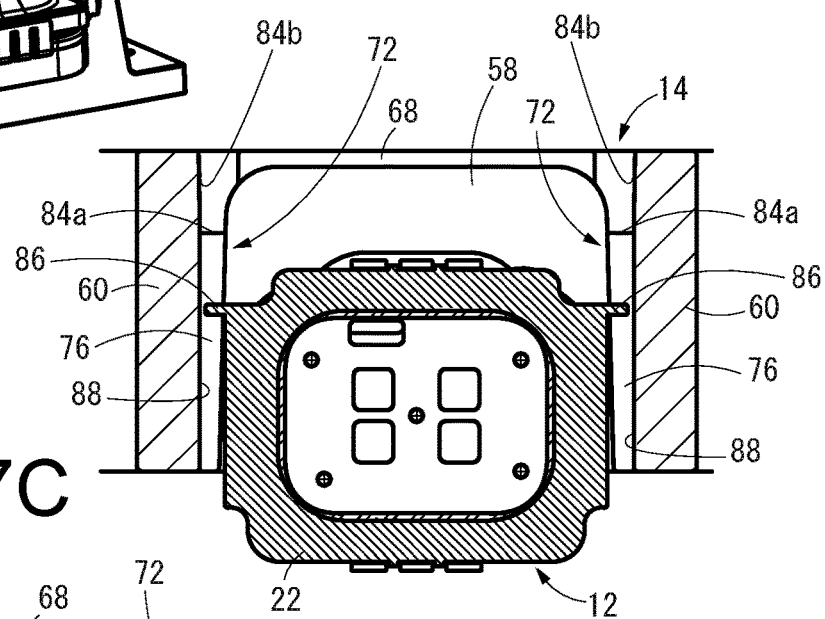
FIG.17C
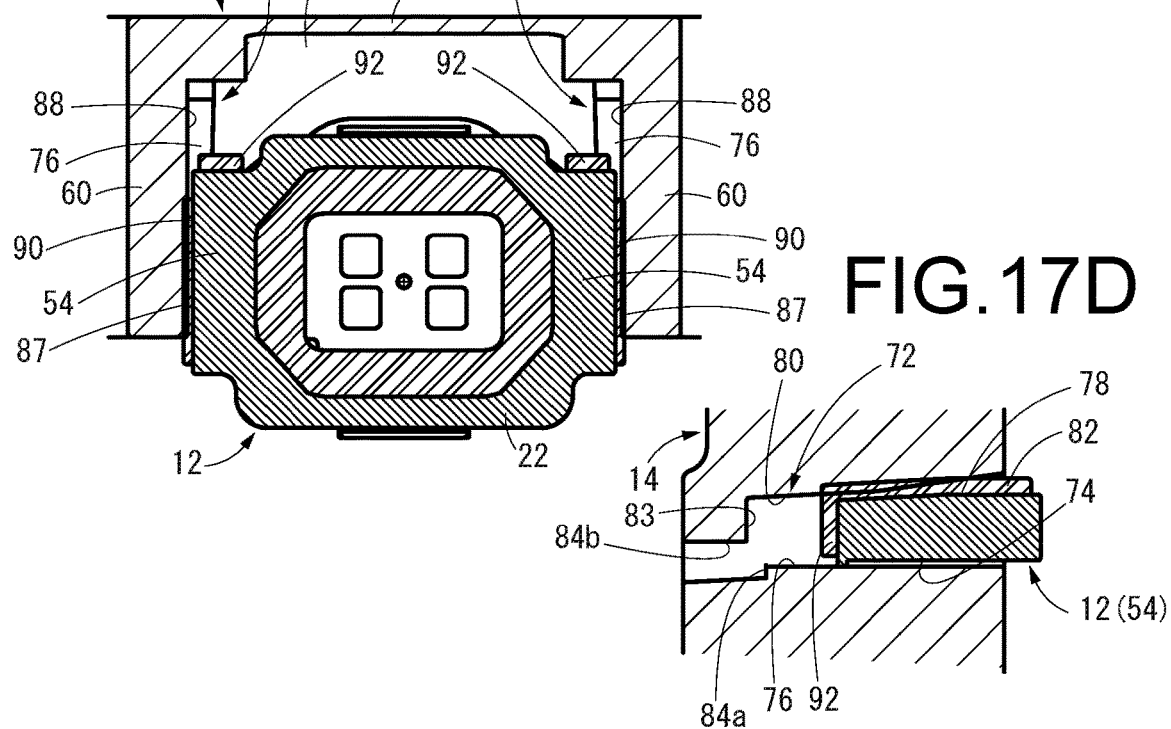
FIG.17D

LIQUID-FILLED VIBRATION DAMPING DEVICE

INCORPORATED BY REFERENCE

The disclosure of Japanese Patent Application No. 2022-027816 filed on Feb. 25, 2022 including the specification, drawings and abstract is incorporated herein by reference in its entirety.

BACKGROUND ART

1. Technical Field

The present disclosure relates to a liquid-filled vibration damping device for use in an automotive engine mount or the like.

2. Description of the Related Art

Conventionally, a vibration damping device in which a vibration-damping device main unit is attached to a bracket from the lateral side has been known as one type of a vibration damping device such as an engine mount for use in a vehicle. Such a vibration-damping device main unit has a structure in which a first attachment member and a second attachment member, which are vertically remote from each other, are elastically connected by a main rubber elastic body. Besides, a pair of connecting grooves are formed in the opposed inner faces of the opposite leg parts of the bracket. A pair of connecting parts, which are provided on opposite sides of the second attachment member of the vibration-damping device main unit, are inserted to be fitted in and supported by the pair of connecting grooves of the bracket, whereby the vibration-damping device main unit is attached to the bracket from the lateral side.

Meanwhile, such a vibration damping device requires a mechanism for preventing the vibration-damping device main unit, which is attached to the bracket from the lateral side, from becoming dislodged from the bracket in the direction opposite to the direction of attachment.

Therefore, U.S. Pat. No. 9,593,732 B2 and Japanese Patent No. JP-B-6808554 propose a mechanism that adopts a second attachment member made of synthetic resin to form an engaging projection, and the engaging projection is engaged with an engaging receiver provided to a bracket by a snap fitting action or the like utilizing elastic deformation of a synthetic resin material, thereby preventing the vibration damping device from becoming dislodged from the bracket.

However, in the mechanism described in U.S. Pat. No. 9,593,732 B2 and JP-B-6808554, when the vibration-damping device main unit is attached to the bracket from the lateral side, it is necessary for the engaging projection of the second attachment member made of synthetic resin to be elastically deformed and engaged with the engaging receiver, and damage during deformation tends to be a problem.

Moreover, since the second attachment member in the vibration-damping device main unit needs to be made of synthetic resin, it may be difficult to achieve the required load-bearing capability and strength characteristics. Also, there is a possibility that time-dependent deterioration such as creep deformation may be a problem. Especially in engine mounts and the like, where the input load is large, due to dimensional changes in the connecting part of the second attachment member caused by deterioration of the synthetic resin over time, a gap may be generated between the connecting part and the connecting groove of the bracket, posing a risk of generating a noise due to rattling.

In view of such problems, the present applicant proposed in U.S. Pat. No. 9,931,923 B2 that the connecting part of the vibration-damping device main unit, which is inserted into the connecting groove of the bracket, has a composite structure in which a connecting part main body integrally formed with the second attachment member and an urging rubber are integrally provided by being vertically overlapped with each other. In the connecting part of such a composite structure, when the vibration-damping device main unit is attached to the bracket from the lateral side, the urging rubber actively undergoes elastic deformation, so that the deformation of the connecting part main body can be reduced or avoided, thereby preventing damage during attachment. Moreover, the second attachment member provided with the connecting part main body can be made of metal, thereby advantageously obtaining the load bearing capability and the strength characteristics of the second attachment member and the connecting part main body while avoiding time-dependent deterioration such as creep deformation as well.

However, further research conducted by the inventors led to the discovery that there is room for further improvement in the vibration damping device disclosed in U.S. Pat. No. 9,931,923 B2 as well. That is, in the vibration damping device disclosed in U.S. Pat. No. 9,931,923 B2, when the connecting part is inserted into the connecting groove, the urging rubber provided on one of the upper and lower sides of the connecting part undergoes compressive deformation, and the connecting part is let climb over a lock projection projecting from the other of the upper and lower sides, so that the connecting part is configured to be prevented from becoming dislodged from the connecting grooves and attached thereto. For this reason, the operation is difficult for attaching the connecting part by letting the connecting part climb over the lock projection under the condition that the connecting part is inserted into the connecting groove to the far side and a large urging force of the urging rubber is applied.

In particular, in the vibration damping devices such as engine mounts, a liquid-filled vibration damping device utilizing a liquid flow is preferably adopted, which includes a liquid chamber sealed by a closure member overlapped on and locked to the second attachment member from below with a seal member sandwiched therebetween. Therefore, when the connecting part is inserted into the connecting groove, the second attachment member including the connecting part may tilt due to climbing over the lock projection. Accordingly, there is a possibility that the closure member is likely to partially interfere with the bracket and the liquid tightness of the seal member may be partially and temporarily impaired. Thus, there is concern about a risk of inducing liquid leakage when the vibration-damping device main unit is attached to the bracket.

SUMMARY

It is therefore one object of the present disclosure to provide a liquid-filled vibration damping device of novel structure which includes a novel dislodgment prevention mechanism capable of preventing damage to the connecting part or the like during attachment of the vibration-damping device main unit to the bracket from the lateral side in comparison with the ones described in U.S. Pat. No. 9,593,732 B2 and JP-B-6808554 thereby improving load-bearing characteristics, suppressing time-dependent deterioration and the like, and which obviates climbing over the lock projection projecting from the connecting groove thereby making it easy to insert the connecting part into the connecting groove while suppressing the tilt of the connecting part, so as to be able to prevent liquid leakage and the like during attachment of the vibration-damping device main unit to the bracket in comparison with the one described in U.S. Pat. No. 9,931,923 B2.

The above and/or optional objects of the present disclosure may be attained according to at least one of the following preferred embodiments of the disclosure. The following preferred embodiments and/or elements employed in each preferred embodiment of the disclosure may be adopted at any possible optional combinations.

A first preferred embodiment of the present disclosure is as described below.

A liquid-filled vibration damping device comprising:
  a vibration-damping device main unit comprising:
    a first attachment member and a second attachment member that are vertically remote from each other and are elastically connected by a main rubber elastic body, the second attachment member comprising a pair of connecting parts provided on opposite sides, and
    a closure member overlapped on and locked to the second attachment member from below with a seal member sandwiched therebetween to define and seal a liquid chamber; and
  a bracket comprising opposite leg parts, the opposite leg parts comprising a pair of connecting grooves provided on opposed inner faces of the opposite leg parts, the vibration-damping device main unit being attached to the bracket from a lateral side by the pair of the connecting parts being inserted into the pair of the connecting grooves, wherein
  the pair of the connecting parts of the second attachment member and the pair of the connecting grooves of the bracket are all made of metal,
  upper urging rubbers are provided on respective upper faces of the pair of the connecting parts while the metal is exposed on lower faces of the pair of the connecting parts, and the pair of the connecting parts are pressed against groove-inside lower faces of the pair of the connecting grooves in metal-to-metal contact by elastic reaction forces due to the upper urging rubbers being in contact with groove-inside upper faces of the pair of the connecting grooves,
  engaging convex parts are provided on the respective lower faces of the pair of the connecting parts, the engaging convex parts being located at far-side ends in a direction of insertion into the pair of the connecting grooves and protruding downward, while engaging concave parts are provided on the respective groove-inside lower faces of the pair of the connecting grooves at locations corresponding to the engaging convex parts, and
  detent engagers that prevent dislodgment of the pair of the connecting parts inserted in the pair of the connecting grooves are constituted in metal-to-metal contact by the pair of the connecting parts being inserted into the pair of the connecting grooves and the engaging convex parts of the connecting parts moving toward a far side in the direction of insertion on the groove-inside lower faces of the pair of the connecting grooves to enter the engaging concave parts of the pair of the connecting grooves to be engaged.

In the liquid-filled vibration damping device of the present preferred embodiment, the second attachment member including the connecting parts are made of metal. This makes it possible to prevent damage to the second attachment member including the connecting part during attachment of the vibration-damping device main unit to the bracket, as well as to avoid problems such as rattling and reduction in strength caused by time-dependent deterioration such as creep deformation in the member made of resin. Moreover, on the lower side (in the bound direction) where the input load to the vibration damping device is likely to be large, the connecting part and the connecting groove are in metal-to-metal contact with each other, so that excellent load bearing capability and positioning capability are readily exhibited. Furthermore, in the direction of dislodgment of the vibration damping device from the bracket as well, the connecting part and the connecting groove are in metal-to-metal contact with each other at the detent engager, thereby obtaining highly reliable resistance to dislodgement.

Besides, the detent engager is constituted by the engaging convex part provided at the far-side end of the connecting part and the engaging concave part of the connecting groove. Thus, when the connecting part is inserted into the connecting groove for attachment, the engaging convex part protruding downward from the connecting part slides to move on the groove-inside lower face of the connecting groove and enters the engaging concave part to be engaged. Therefore, there is no need to provide a lock projection or the like on the connecting groove, and it is not necessary to let the connecting part climb over the lock projection or the like when inserting the connecting part into the connecting groove for attachment. This makes it possible to avoid difficulty in attaching the connecting part and a large tilt of the connecting part due to climbing over the lock projection or the like, thereby easily inserting the connecting part into the connecting groove. In addition, it is also possible to avoid temporary deterioration in sealing performance caused by local interference of the closure member with the bracket or the like due to the second attachment member greatly tilting when climbing over the lock projection, thereby achieving prevention of liquid leakage during attachment of the vibration-damping device main unit to the bracket.

A second preferred embodiment of the present disclosure is as described below.

The liquid-filled vibration damping device according to the first preferred embodiment, wherein the bracket further comprises a lower support part that is in contact with the closure member of the vibration-damping device main unit from below and supports the closure member with the seal member sandwiched between the closure member and the second attachment member supported by the pair of the connecting grooves of the bracket.

In the liquid-filled vibration damping device of the present preferred embodiment, when the connecting part is inserted into the connecting groove for attachment, by utilizing the downward movement of the connecting part due to the engaging convex part of the connecting part entering the engaging concave part of the connecting groove to be engaged, the seal member can be more firmly sandwiched between the second attachment member having the connecting part and the closure member. As a result, in the vibration-damping device main unit, it is possible to obtain a higher level of sealing performance of the liquid chamber in the attached state to the bracket than before the attachment to the bracket.

A third preferred embodiment of the present disclosure is as described below.

The liquid-filled vibration damping device according to the first or second preferred embodiment, wherein outer peripheral urging rubbers are provided on respective outer peripheral surfaces of the pair of the connecting parts, and the outer peripheral urging rubbers are in contact with respective groove-inside bottom faces of the pair of the connecting grooves.

In the liquid-filled vibration damping device of the present preferred embodiment, in the direction of opposition of the pair of the connecting grooves, the pair of connecting parts can be press-fitted into the pair of connecting grooves via the outer peripheral urging rubbers to be positioned and supported thereby. Therefore, by utilizing the elastic deformation of the outer peripheral urging rubbers, it is possible to compatibly achieve good attachment workability and positioning capability of the vibration-damping device main unit with respect to the bracket in the direction of opposition of the pair of connecting grooves as well.

A fourth preferred embodiment of the present disclosure is as described below.

The liquid-filled vibration damping device according to any of the first to third preferred embodiments, wherein
left and right opposite side portions of the second attachment member include flat lower faces, and concave surfaces are formed on respective outer peripheral end edges of the flat lower faces of the left and right opposite side portions, the concave surfaces extending linearly in a front-back direction from a backward-side end toward a forward side in the direction of insertion into the pair of the connecting grooves,
the pair of the connecting parts are constituted by the left and right opposite side portions where the respective concave surfaces are formed, and the concave surfaces comprise exposed surfaces of the metal that are pressed against the groove-inside lower faces of the pair of the connecting grooves in metal-to-metal contact, and
the concave surfaces do not reach respective forward-side ends on the flat lower faces of the left and right opposite side portions, and the engaging convex parts are constituted by portions where the concave surfaces are not formed on the forward side with respect to the concave surfaces.

In the liquid-filled vibration damping device of the present preferred embodiment, the pair of connecting parts are formed on the left and right opposite side portions of the second attachment member so as to have the concave surfaces. This makes it possible to form the engaging convex part on the far-side end with a lower face connected to a lower face of the second attachment member. Therefore, even if the engaging convex part is small, the engaging convex part can be easily formed, and its strength can be efficiently obtained.

A fifth preferred embodiment of the present disclosure is as described below.

The liquid-filled vibration damping device according to any of the first to fourth preferred embodiments, wherein a distal end urging rubber is provided on a distal end face of the second attachment member in a direction of attachment from the lateral side to the bracket and is in contact with the bracket in the direction of attachment.

In the liquid-filled vibration damping device of the present preferred embodiment, the urging force of the distal end urging rubber is exerted on the vibration-damping device main unit in the direction opposite to the direction of attachment to the bracket. This makes it possible to hold the detent engager in the contact engaged state in which dislodgment of the connecting part from the connecting groove is prevented, so as to stabilize the positioned state of the connecting part in the direction of insertion with respect to the connecting groove, which is advantageous in preventing rattling or the like.

A sixth preferred embodiment of the present disclosure is as described below.

The liquid-filled vibration damping device according to any of the first to fifth preferred embodiments, wherein the groove-inside upper faces of the pair of the connecting grooves have a guide taper at least in opening portions on a side from which the pair of the connecting parts are inserted, the guide taper sloping to increase a groove width from the far side toward an opening side in the direction of insertion of the pair of the connecting parts.

In the liquid-filled vibration damping device of the present preferred embodiment, the insertion of the connecting part into the connecting groove is facilitated by being guided by the guide taper. Thus, even when the urging force of the upper urging rubber provided to the connecting part is set large, the operation workability of the insertion of the connecting part into the connecting groove, and hence the attachment workability of the vibration-damping device main unit to the bracket can be favorably maintained.

A seventh preferred embodiment of the present disclosure is as described below.

The liquid-filled vibration damping device according to any of the first to sixth preferred embodiments, wherein
the bracket includes a pair of support leg parts that are opposed to each other with a prescribed distance therebetween,
the pair of the connecting grooves are provided on opposed inner faces of the pair of the support leg parts,
a far wall is provided on a side opposite to a side to which the vibration-damping device main unit is attached between the pair of the support leg parts, and
the engaging concave parts provided at the far-side ends of the pair of the connecting grooves are formed such that the engaging concave parts penetrate the far wall and extend to the far side.

In the liquid-filled vibration damping device of the present preferred embodiment, it is possible to simplify the shape and structure of the engaging concave part. Besides, the mold material for molding the engaging concave part can be inserted into the mold cavity so as to pass through the far wall of the bracket, thereby simplifying the mold structure of the bracket including the engaging concave part as well.

According to the present disclosure, the second attachment member including the connecting parts can be made of metal. Besides, in the bound direction and in the direction of dislodgement of the vibration-damping device main unit from the bracket, the connecting part is in metal-to-metal contact with the bracket, thereby exhibiting excellent load bearing capability and reliability.

Moreover, since it is not necessary to provide a lock projection or the like to the connecting groove in the detent engager, when the connecting part is inserted into the connecting groove for attachment, the problem of damage to the lock projection or the like is avoided, and tilt of the connecting part due to climbing over the lock projection or the like is also avoided. Therefore, the operation of inserting the connecting part into the connecting groove for attachment can be facilitated, while avoiding temporary deterioration in sealing performance caused by local interference of the closure member with the bracket or the like due to tilt of the second attachment member provided with the connecting part, thereby achieving prevention of liquid leakage during attachment of the vibration-damping device main unit to the bracket.

BRIEF DESCRIPTION OF THE DRAWINGS

The foregoing and/or other objects, features and advantages of the disclosure will become more apparent from the following description of a practical embodiment with reference to the accompanying drawings in which like reference numerals designate like elements and wherein:

FIGS. 17A-17D are views suitable for explaining an intermediate state when the mount main unit shown in FIG. 8 is attached to the bracket shown in FIG. 13 from the lateral side.

DETAILED DESCRIPTION

Figure 1A:
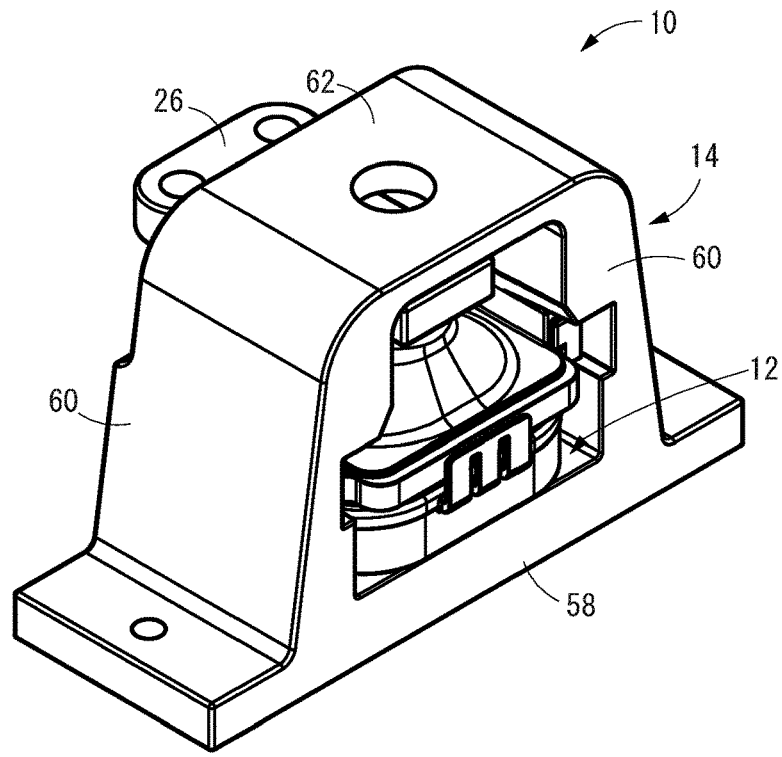
FIGS. 1A and 1B are overall perspective views showing a liquid-filled vibration damping device in the form of an engine mount as a first practical embodiment of the present disclosure.
Figure 1B:
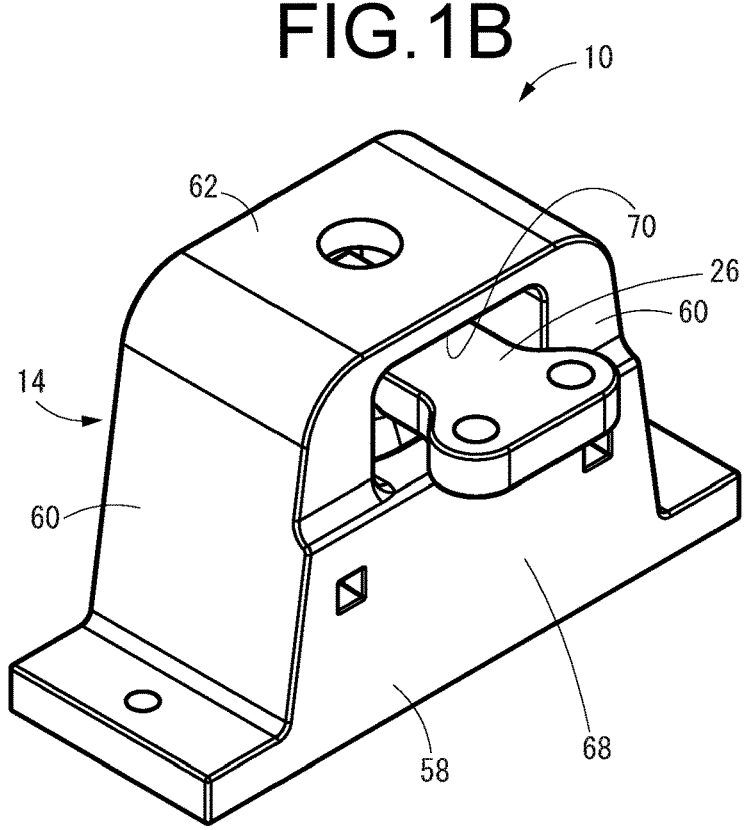
Figure 2:
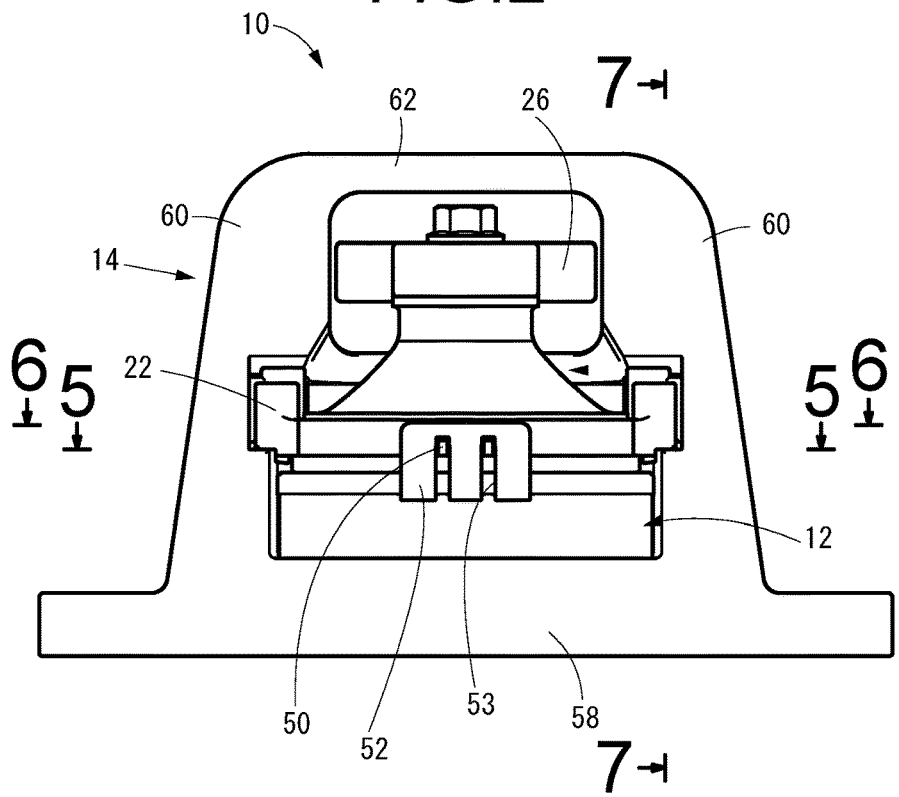
FIG. 2 is a front view of the engine mount shown in FIG. 1.
Figure 3:
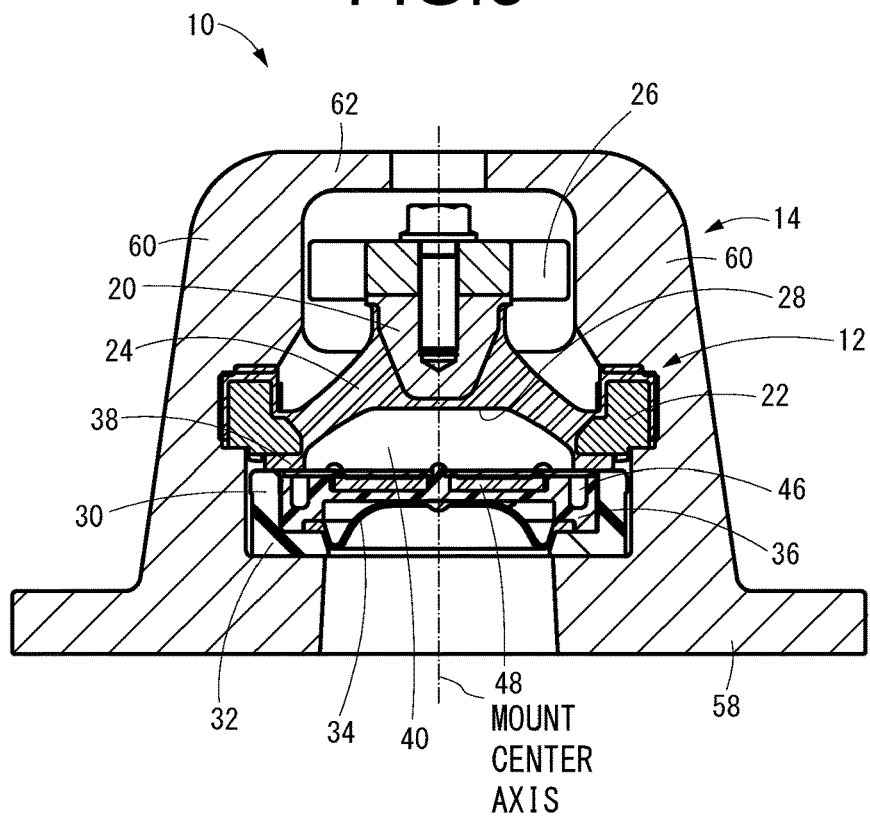
FIG. 3 is a vertical cross sectional view of the engine mount shown in FIG. 1.
Figure 4:
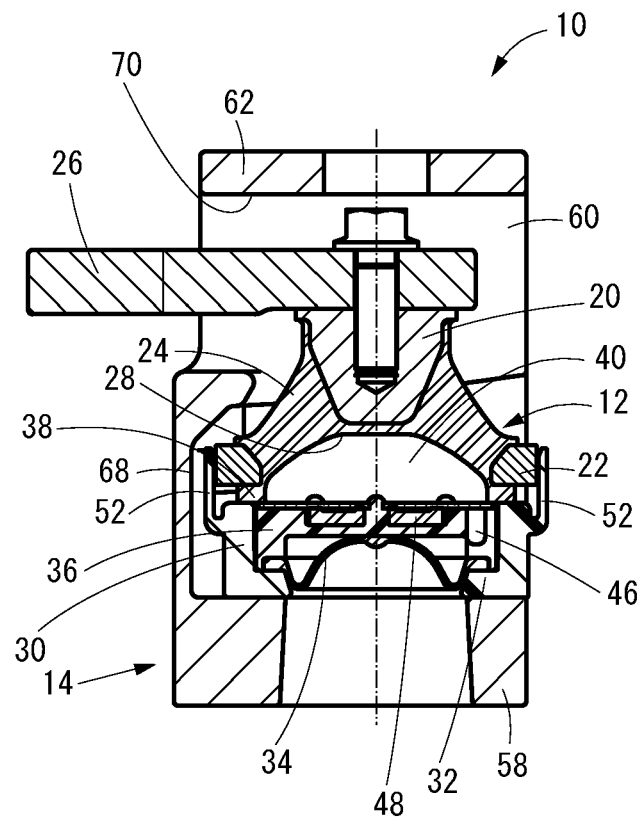
FIG. 4 is a vertical cross sectional view of the engine mount shown in FIG. 1, in a direction orthogonal to FIG. 3.
Figure 5:
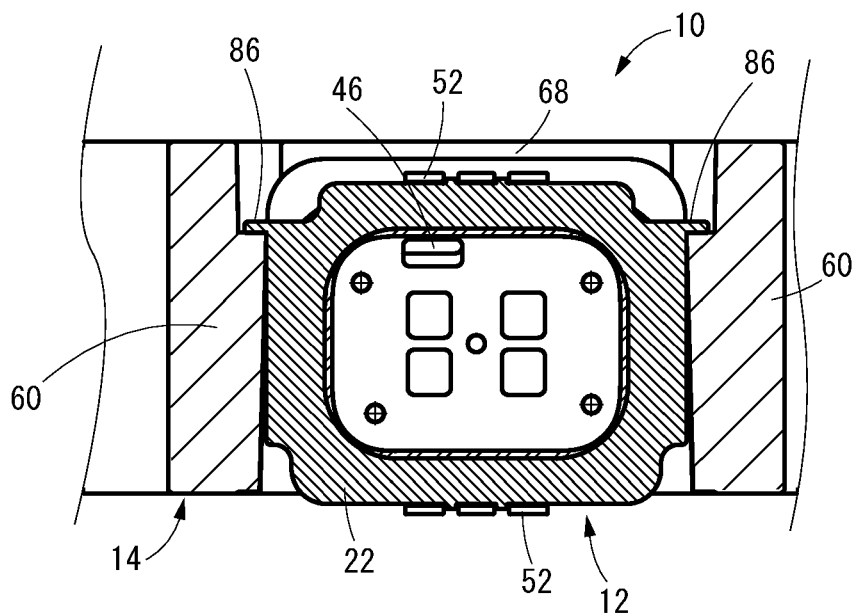
FIG. 5 is a cross sectional view taken along line 5-5 of FIG. 2.

Hereinafter, practical embodiments of the present disclosure will be described in reference to the drawings.

FIGS. 1 to 7 depict an automotive engine mount 10 as a first practical embodiment of a liquid-filled vibration damping device constructed according to the present disclosure. The engine mount 10 has a structure in which a mount main unit 12 serving as a vibration-damping device main unit is laterally inserted into a bracket 14 from the lateral side, so as to be attached by so-called lateral insertion. In the following description, as a general rule, the vertical direction refers to the vertical direction in FIG. 3, which is the direction along the mount center axis. Besides, it is assumed that the engine mount 10 of the present practical embodiment is installed between a body and a power unit of an automobile with the vertical direction in FIG. 3 being coincident with the vertical direction, the left-right direction in FIG. 3 being coincident with the vehicle front-back direction, and the direction perpendicular to the paper surface in FIG. 3 being coincident with the vehicle left-right direction. However, in order to make it easier to understand the drawings, in the following explanation, the left-right direction in FIG. 3 refers to the mount left-right direction, and the direction perpendicular to the paper surface in FIG. 3 refers to the mount front-back direction (or the far/near direction). In each figure, each rubber elastic body (the urging rubber) provided on the mount main unit 12 is shown as it is before attachment to the bracket 14, in order to make it easier to see whether or not the urging rubber is compressed when attached to the bracket 14.

Described more specifically, the mount main unit 12 has a structure in which a first attachment member 20 and a second attachment member 22 are elastically connected by a main rubber elastic body 24, as shown in FIGS. 8 to 12 in isolation in addition to FIGS. 1 to 7. A support load and a vibration of the power unit will be input across the first attachment member 20 and the second attachment member 22.

The first attachment member 20 is a high rigidity component made of metal or the like, and has a solid block structure such as a vertically inverted frustoconical shape. As illustrated in FIGS. 1 to 4, an attachment part 26 configured to be attached to the power unit or the like is fixed to the first attachment member 20 with a fixing bolt or the like.

Figure 6:
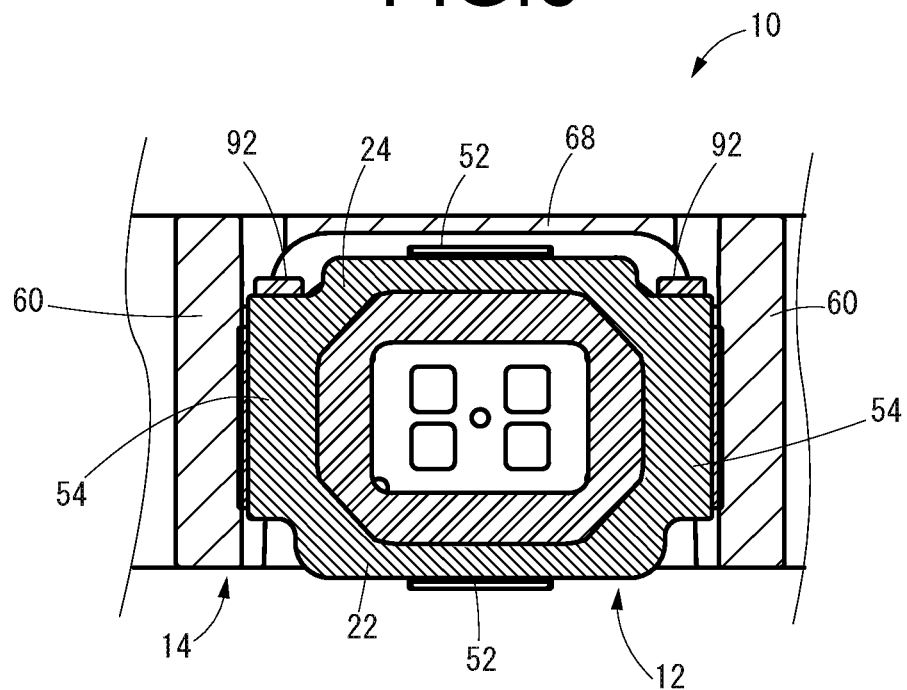
FIG. 6 is a cross sectional view taken along line 6-6 of FIG. 2.

The second attachment member 22 is a high rigidity component made of metal such as aluminum alloy or steel, and has an approximately thick-walled annular block shape overall. In the present practical embodiment in particular, as can be seen in FIG. 6, the second attachment member 22 includes a rounded rectangular through hole in the center, and has an approximately rectangular, thick-walled annular block shape overall.

The main rubber elastic body 24 elastically connecting the first attachment member 20 and the second attachment member 22 has an approximately oval shape or a rounded rectangular shape in the circumferential direction, and has an outer peripheral surface shape whose outer diameter dimension gradually becomes smaller from the bottom to the top. The first attachment member 20 is fastened to the upper-end, small-diameter portion of the main rubber elastic body 24 in an approximately embedded state so as to be inserted therein, while the second attachment member 22 is fastened to the lower-end, large-diameter outer peripheral portion thereof. The main rubber elastic body 24 desirably takes the form of an integrally vulcanization molded component incorporating the first and second attachment members 20, 22.

The main rubber elastic body 24 is provided with an inverted recess 28 that opens in the center of the lower face, and the recess 28 opens downward through the through hole of the second attachment member 22. Besides, a closure member 30 is overlapped and attached on the second attachment member 22 from below.

The closure member 30 is made of a rigid, synthetic resin material or the like, and has an approximately thick-walled annular block shape corresponding to the second attachment member 22. In addition, the closure member 30 includes a support base part 32 protruding inward from the lower end, and the cross-sectional shape of the closure member 30 has an approximately L shape. A flexible film 34 and an orifice member 36 are inserted into the closure member 30 from above, and attached thereto in a housed state so as to be overlapped on the support base part 32. The flexible film 34 and the orifice member 36 are vertically sandwiched and fixedly supported between the second attachment member 22 and the closure member 30 at their outer peripheral portions.

On the upper side of the closure member 30, the space between the second attachment member 22 on one side and the closure member 30 and the orifice member 36 on the other is sealed by a sealing rubber 38 serving as a seal member, which is provided on the lower face of the second attachment member 22, being sandwiched therebetween. Further, on the lower side of the closure member 30, the space between the closure member 30 and the orifice member 36 is sealed by vertically sandwiching the outer peripheral portion of the flexible film 34.

With this configuration, the recess 28 of the main rubber elastic body 24 is covered with the flexible film 34 and is liquid-tightly sealed, thereby defining a liquid chamber 40 filled with a predetermined liquid. Besides, the liquid chamber 40 is vertically partitioned by the approximately plate-shaped orifice member 36. On the upper side of the orifice member 36, formed is a pressure-receiving chamber whose wall is partly constituted by the main rubber elastic body 24, and in which pressure fluctuations arise due to the vibration input. On the lower side of the orifice member 36, formed is a variable-capacity equilibrium chamber whose wall is partly constituted by the flexible film 34 such as a diaphragm rubber thereby absorbing pressure fluctuations.

The pressure-receiving chamber and the equilibrium chamber communicates with each other through an orifice passage 46 provided in the orifice member 36, so that a vibration damping effect will be exhibited by utilizing the flow action of the fluid flowing through the orifice passage 46 when vibration is input. In the present practical embodiment, a housing area is formed so as to be located in the central portion of the orifice member 36 and to spread in the direction orthogonal to the mount center axis, and communicates with each of the pressure-receiving chamber and the equilibrium chamber. The movable film 48 is housed within the housing area. For example, during input of a vibration in a high-frequency range, which exceeds the tuning frequency of the orifice passage 46, the pressure fluctuations in the pressure-receiving chamber will be reduced or absorbed based on deformation or displacement of the movable film 48, thereby avoiding a significant development of high dynamic spring.

The specific structure of the liquid chamber 40, the tuning characteristics of the orifice passage 46, presence or absence of the high-frequency liquid pressure absorption mechanism by the movable film 48, and the like are not limited, but can be appropriately set depending on the required vibration damping characteristics. Besides, although the assembly structure of the closure member 30 with respect to the second attachment member 22 is not limited, in the present practical embodiment, a locking mechanism by hooking using a resin hook is adopted.

Specifically, the locking mechanism is constituted by a locking claw 50 protruding from the outer peripheral surface of the second attachment member 22 and a flexible locking piece 52 extending upward from the outer peripheral surface of the closure member 30. The locking piece 52 includes a locking hole 53 extending in the vertical direction, and by the locking claw 50 being hooked to the locking hole 53, the closure member 30 is attached and fixed to the second attachment member 22. The locking hole 53 of the locking piece 52 and the locking claw 50 are provided at positions corresponding to each other and form a pair, and a plurality of pairs are provided in the circumferential direction of the second attachment member 22 and the closure member 30. In the present practical embodiment in particular, each of the portions of the closure member 30 extending approximately linearly on the opposite sides in the front-back direction is provided with one locking piece 52 formed in a plate shape. Each locking piece 52 includes two locking holes 53, 53 formed so as to be spaced apart from each other in the circumferential direction. The locking claw 50 is formed at a position corresponding to each of these locking holes 53, and a total of four pairs of locking holes 53 and locking claws 50 are provided in the entire circumferential direction.

By the upper face of the closure member 30 being overlapped with the lower face of the second attachment member 22 from below, and by the sealing rubber 38 being pressed against and brought closer to the said lower face, the operation of hooking of the locking claws 50 to the locking holes 53 can be realized approximately simultaneously by utilizing elastic deformation and recovery of each locking piece 52.

Moreover, the second attachment member 22 to which the closure member 30 is attached is provided with a pair of connecting parts 54, 54 at the outer peripheral portions on the left and right opposite sides where the locking claws 50 are not formed. The connecting parts 54, 54 extend linearly in the front-back direction while each having an approximately constant thickness. With the mount main unit 12 attached to the bracket 14, the second attachment member 22 is fixedly supported by the bracket 14 by utilizing these connecting parts 54, 54.

Figure 13:
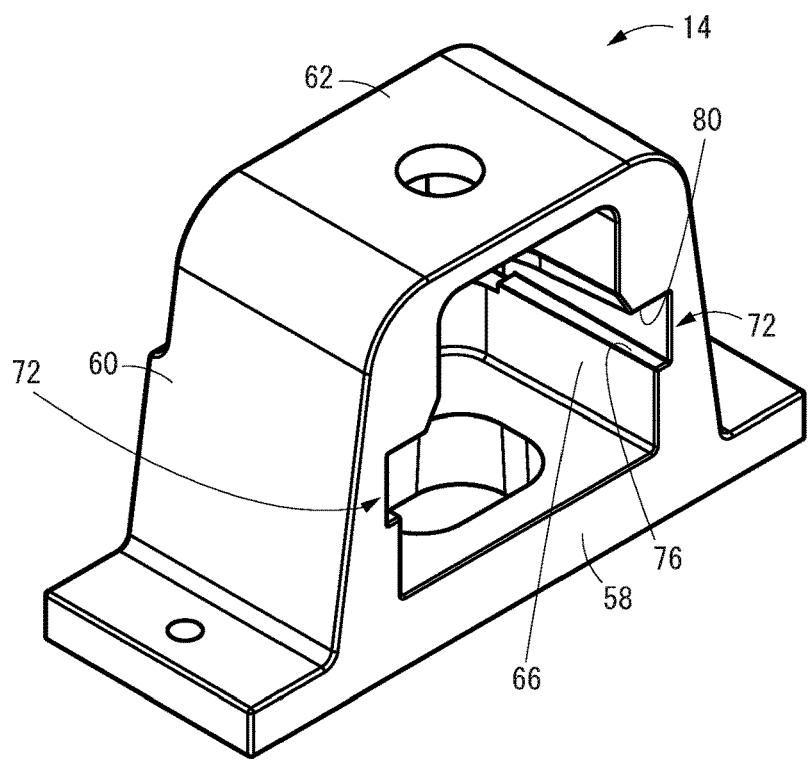
FIG. 13 is an overall perspective view showing a bracket of the engine mount shown in FIG. 1.
Figure 14:
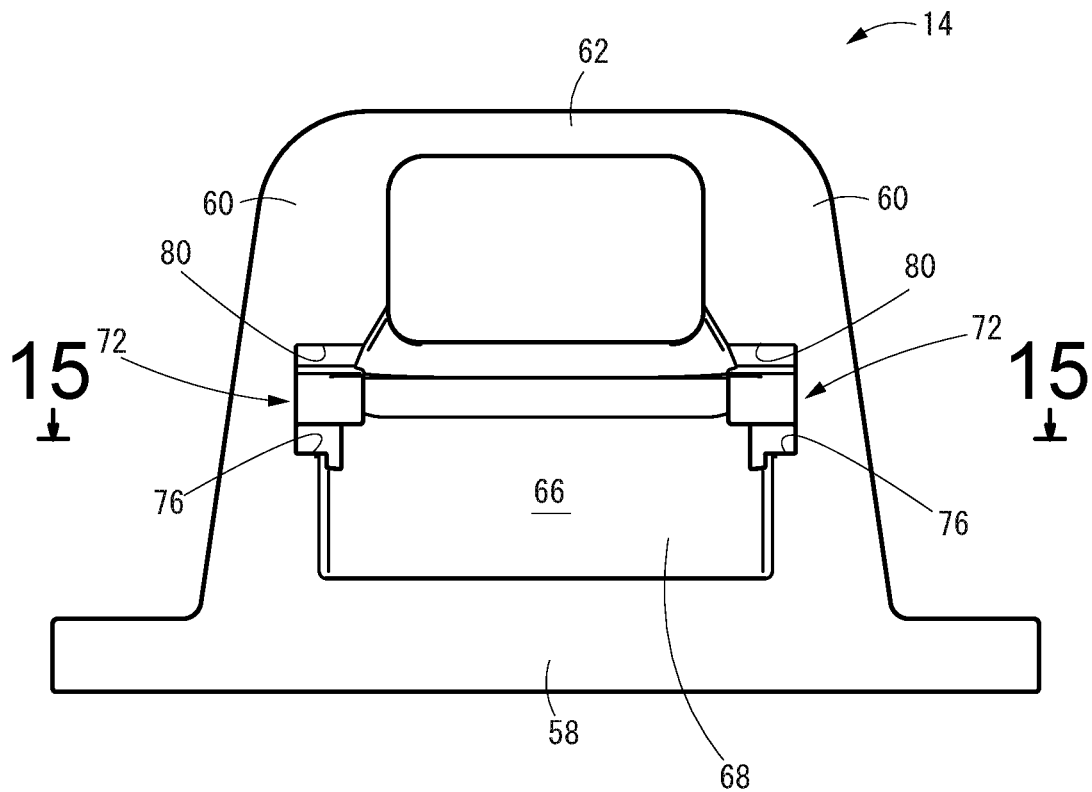
FIG. 14 is a front view of the bracket shown in FIG. 13.
Figure 15:
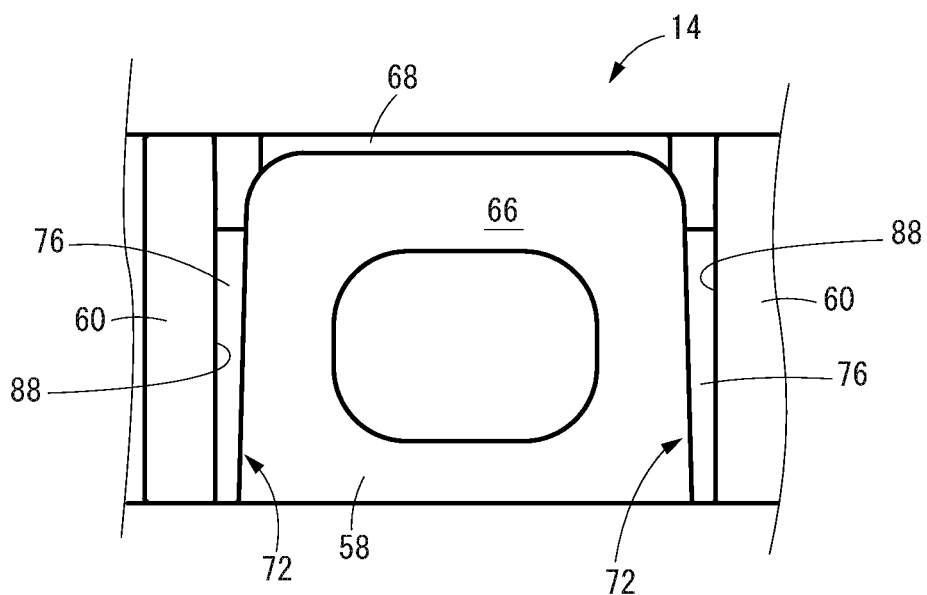
FIG. 15 is a cross sectional view taken along line 15-15 of FIG. 14.

The bracket 14 is a high rigidity component made of metal such as aluminum alloy, or fiber-reinforced resin, or the like. As shown in FIGS. 13 to 15 in addition to FIGS. 1 to 7, the bracket 14 integrally includes left and right attachment leg parts 60, 60 rising upward from the upper face of a base part 58 having a rectangular flat-plate shape, and a top plate part 62 integrally connecting the upper ends of the left and right attachment leg parts 60, 60. The left and right attachment leg parts 60, 60 serve as support leg parts that are opposed to each other with a prescribed distance therebetween. An installation space 66 in which the mount main unit 12 is attached is formed so as to open to the lateral side in a state of being surrounded by the base part 58, the left and right attachment leg parts 60, 60, and the top plate part 62.

A far wall 68 is integrally provided on the far side of the installation space 66 (the side opposite to the laterally opening side) so as to close the opening of the installation space 66. Besides, an insertion hole 70 through which the attachment part 26 is inserted for attachment to the mount main unit 12 (the first attachment member 20) in the upper portion of the far wall 68. The opposite sides of the base part 58 constitute fixing plate parts extending outward from the respective attachment leg parts 60, and the bracket 14 is configured to be fixed by bolting to the vehicle body side at the pair of fixing plate parts.

The left and right attachment leg parts 60, 60 are thick-walled plates having a predetermined width dimension in the front-back direction, and are opposed to each other in the left-right direction. Further, the left and right attachment leg parts 60, 60 include connecting grooves 72, 72 that open onto the opposed inner faces and extend in the front-back direction.

Then, the pair of connecting parts 54, 54 provided to the second attachment member 22 of the mount main unit 12 are inserted into the pair of connecting grooves 72, 72 from the lateral side, and the mount main unit 12 is laterally inserted into and attached to the bracket 14, as the attachment process shown in FIGS. 16 to 18 in sequence.

In such an attachment state, the closure member 30 of the mount main unit 12 is supported with the lower face of the bottom wall overlapped on the upper face of the base part 58 of the bracket 14 in a state of contact. That is, in the present practical embodiment, the base part 58 of the bracket 14 constitutes a lower support part that supports the closure member 30 from below. The second attachment member 22 and the closure member 30 of the mount main unit 12 are mutually held positioned by the connecting grooves 72, 72 of the bracket 14 and the base part 58 in the mount axial direction. In short, in the isolated state of the mount main unit 12 before attachment to the bracket 14, the second attachment member 22 and the closure member 30 are temporarily fixed, so to speak, by the locking mechanism of the locking claw 50 and the locking piece 52. Through attachment to the bracket 14, the second attachment member 22 and the closure member 30 are brought to the fixed state of being firmly positioned with respect to each other.

Here, the pair of connecting parts 54, 54 and the pair of connecting grooves 72, 72 each have a special feature configured such that with the mount main unit 12 attached to the bracket 14, the connecting parts 54, 54 of the second attachment member 22 are positioned and fixedly supported by the connecting grooves 72, 72 of the bracket 14.

Specifically, the pair of connecting parts 54, 54 of the second attachment member 22 are provided such that in the left and right opposite side portions of the second attachment member 22, the middle portions in the front-back direction bulge radially outward by a predetermined length. The lower face of the second attachment member 22 comprises a flat surface perpendicular to the mount center axis at least at the said portions that bulge radially outward on the left and right opposite sides. In the present practical embodiment in particular, the lower surface of the second attachment member 22 comprises a flat surface in its entirety.

In addition, in the portions that bulge radially outward on the left and right opposite sides of the second attachment member 22, there are formed concave surfaces 74, 74 that are located at the respective outer peripheral end edges and extend linearly in the front-back direction from the near side end (the backward-side end) toward the far side (the forward side) in the direction of insertion into the connecting grooves 72, 72. The second attachment member 22 made of metal is exposed on the concave surfaces 74, 74, which are the lower faces of the pair of connecting parts 54, 54, and extends linearly with an approximately constant width in the front-back direction while having an approximately horizontal and flat metal surface, together with groove-inside lower faces 76, 76 of the corresponding connecting grooves 72, 72.

Here, upper faces 78, 78 of the pair of connecting parts 54, 54 and groove-inside upper faces 80, 80 of the pair of connecting grooves 72, 72 may also be flat surfaces extending approximately horizontally in the front-back direction. However, in the present practical embodiment, the upper faces 78, 78 of the pair of connecting parts 54, 54 and the groove-inside upper faces 80, 80 of the pair of connecting grooves 72, 72 both have a sloping surface that slopes gradually upward from the far side (the forward side) toward the near side (the backward side). With this configuration, improvement in workability of inserting the connecting parts 54, 54 into the connecting grooves 72, 72, improvement in efficiency of compressive action to upper urging rubbers 82, 82 described below, and the like can be achieved. In the present practical embodiment in particular, the slope angle of the groove-inside upper faces 80, 80 of the pair of connecting grooves 72, 72 is made even larger in proximity to the near-side end (the backward-side end), thereby achieving further ease of insertion of the connecting parts 54, 54 or the like.

Figure 7:
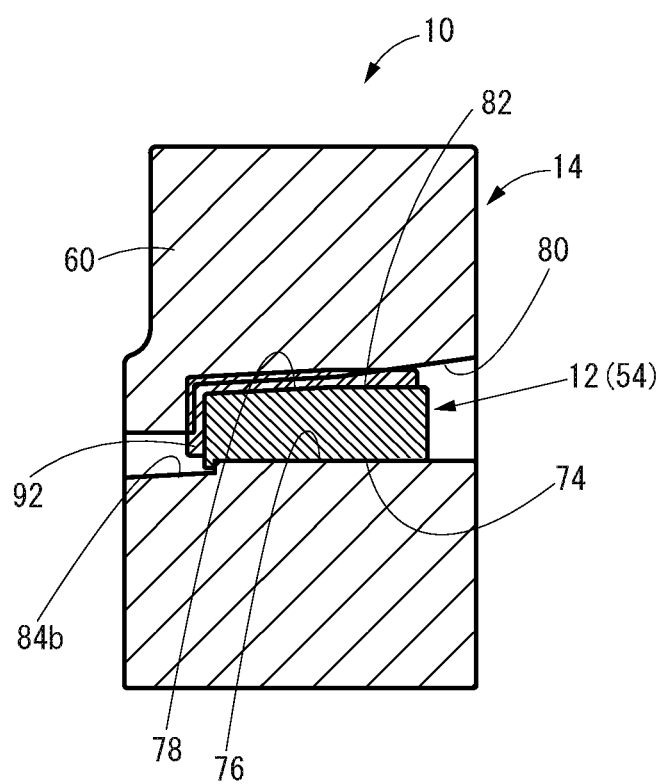
FIG. 7 is a cross sectional view taken along line 7-7 of FIG. 2.
Figure 8:
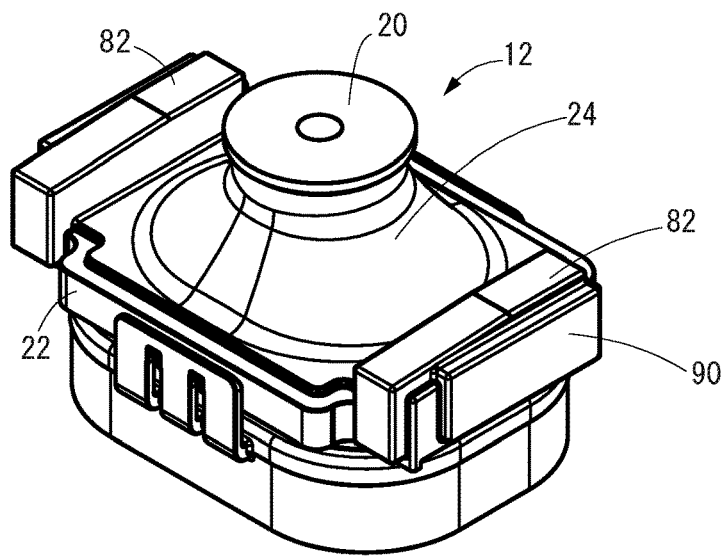
FIG. 8 is a perspective view showing a vibration-damping device main unit in the form of a mount main unit of the engine mount shown in FIG. 1 in its entirety viewed from a far side.
Figure 9:
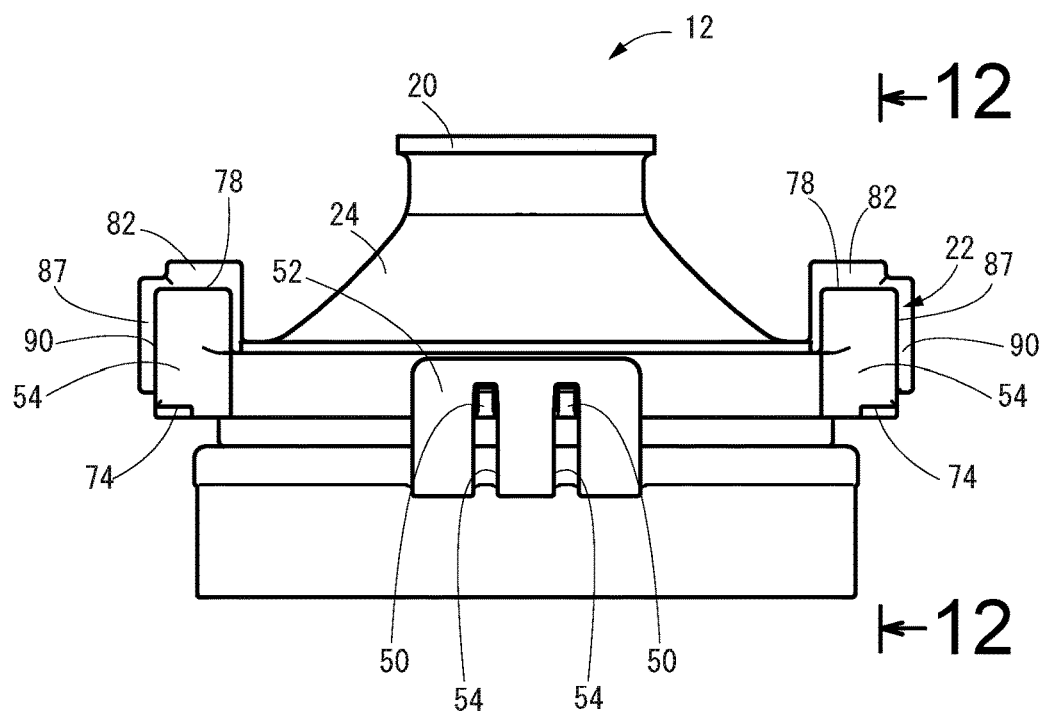
FIG. 9 is a front view of the mount main unit shown in FIG. 8.
Figure 10:
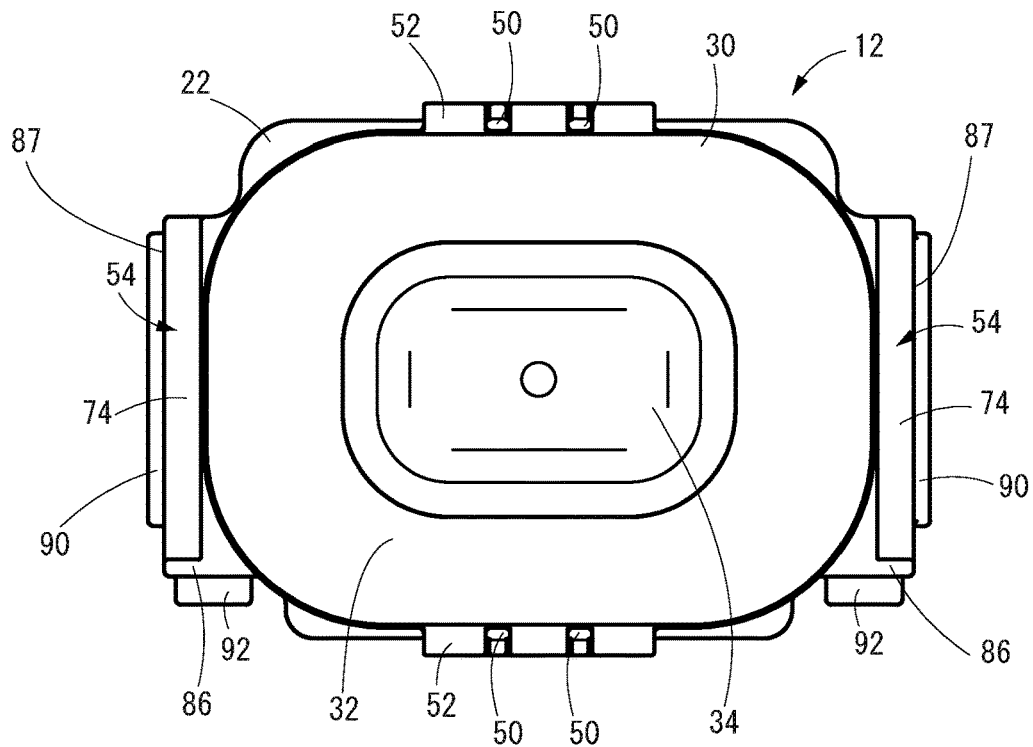
FIG. 10 is a bottom plan view of the mount main unit shown in FIG. 8.
Figure 11:
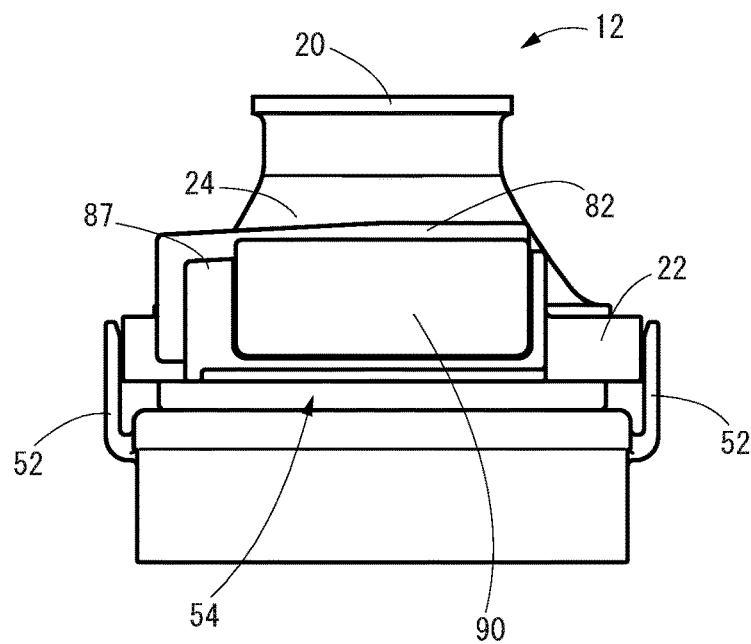
FIG. 11 is a left side view of the mount main unit shown in FIG. 8.
Figure 12:
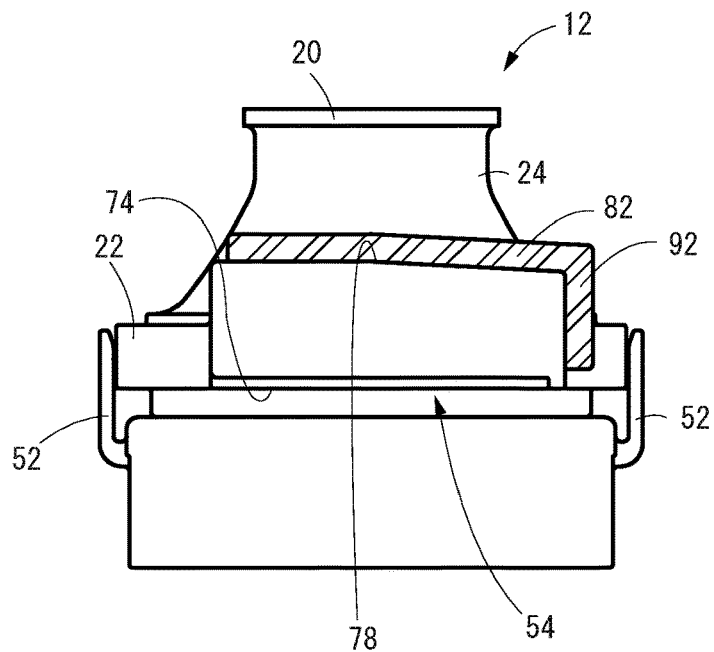
FIG. 12 is a cross sectional view taken along line 12-12 of FIG. 9.

As can be understood from FIG. 7 and the like, the vertical thickness dimension of the pair of connecting parts 54, 54 is slightly smaller than the groove-inside vertical dimension (the groove width dimension) of the pair of connecting grooves 72, 72, with the mount main unit 12 properly attached to the bracket 14. Besides, the upper urging rubbers 82, 82 are provided on the respective upper faces 78, 78 of the pair of connecting parts 54, 54.

The thickness dimension of the upper urging rubbers 82, 82 (the projecting height dimension upward from the connecting parts 54, 54) is approximately constant throughout the entirety, and is larger than the differential between the vertical thickness dimension of the connecting parts 54, 54 and the groove-inside vertical dimension of the connecting grooves 72, 72. With this configuration, regarding the second attachment member 22 attached to the bracket 14 by the pair of connecting parts 54, 54 being inserted into the pair of connecting grooves 72, 72, due to the repulsive elastic force of the upper urging rubbers 82, 82 that are in contact with and compressed by the groove-inside upper faces 80, 80 of the connecting grooves 72, 72, the lower faces (the concave surfaces) 74, 74 of the pair of connecting parts 54, 54 are pressed against and positioned by the groove-inside lower faces 76, 76 of the connecting grooves 72, 72 in metal-to-metal contact.

Moreover, the groove-inside lower faces 76, 76 of the connecting grooves 72, 72 in the bracket 14 each include a lower stepped face 84a that is located on the slightly nearer side than a far wall face 83 (see FIG. 16D) at the far-side end of the connecting groove 72. An engaging concave part 84b extending to the far side beyond the location of the far wall face 83 is formed on the farther side than the lower stopped face 84a. In the present practical embodiment in particular, the engaging concave part 84b is a hole for demolding that extends approximately linearly toward the far side of the bracket 14 and penetrates the far wall 68 of the bracket 14. That is, the engaging concave part 84b having the lower stepped face 84a can be molded by a partitioned mold component that is inserted into the molding cavity of the bracket 14 through the hole for demolding, at the same time of forming the bracket 14.

On the other hand, at the far-side ends of the connecting parts 54, 54 of the second attachment member 22, since the concave surfaces 74, 74 do not reach the far-side ends of the connecting parts 54, 54, respective engaging convex parts 86, 86 are integrally formed so as to protrude downward from the concave surfaces 74, 74. With the second attachment member 22 attached to the bracket 14, the pair of engaging convex parts 86, 86 enter the respective engaging concave parts 84b, 84b, and the near-side surface of each engaging convex part 86 comes into metal-to-metal contact with the lower stepped face 84a to be in an engaged state, so as to constitute an detent engager. That is, due to the engaging action of metal-to-metal contact between the metal surfaces of the engaging convex parts 86, 86 and the engaging concave parts 84b, 84b, the pair of connecting parts 54, 54 of the second attachment member 22 are held in an inserted state in the pair of connecting grooves 72, 72 of the bracket 14, so as to be prevented from becoming dislodged. Here, the engaging convex parts 86, 86 that have entered downward toward the engaging concave parts 84b, 84b are inhibited from moving upward by the repulsive elastic force of the compressed upper urging rubbers 82, 82 being exerted on the connecting parts 54, 54, whereby the engaged state between the engaging convex parts 86, 86 and the engaging concave parts 84b, 84b is maintained.

In addition, outer peripheral surfaces 87, 87 of the pair of connecting parts 54, 54 extend in parallel to each other in the front-back direction with a constant width in the vertical direction. However, for example, the outer peripheral surfaces 87, 87 may comprise sloping surfaces whose projecting height to the radial outside gradually and slightly increases from the far side (the forward side, which is the upper side in FIG. 6) toward the near side (the backward side, which is the lower side in FIG. 6), thereby improving insertion workability into the connecting grooves 72, 72. In this case, it is desirable that groove-inside bottom faces 88, 88 of the connecting grooves 72, 72 also comprise corresponding sloping surfaces.

Furthermore, as can be understood from FIG. 6 and the like, the left-right separation dimension between the outer peripheral surfaces 87, 87 of the pair of connecting parts 54, 54, that is, the member external size in the left-right direction of the second attachment member 22 at the portion forming the connecting parts 54, 54, is slightly smaller than the distance between opposed groove-inside bottom faces 88, 88 of the pair of connecting grooves 72, 72. Besides, outer peripheral urging rubber 90, 90 are provided on the outer peripheral surfaces 87, 87 of the pair of connecting parts 54, 54 over approximately the entire face thereof. The total value of the thickness dimensions of the left and right outer peripheral urging rubbers 90, 90 (the projecting height dimensions to the lateral side from the connecting parts 54, 54) is larger than the differential between the left-right separation dimension between the outer peripheral surfaces 87, 87 of the pair of connecting parts 54, 54, and the distance between the opposed groove-inside bottom faces 88, 88 of the pair of connecting grooves 72, 72.

With this configuration, the second attachment member 22 attached to the bracket 14 by the pair of connecting parts 54, 54 being inserted into the pair of connecting grooves 72, 72 is subjected to the repulsive elastic force of the outer peripheral urging rubbers 90, 90 that are in contact with and compressed by the groove-inside bottom faces 88, 88 of the connecting grooves 72, 72 on the radially outer side of both the left and right connecting parts 54, 54. The second attachment member 22 is held and positioned approximately in the center between the left and right attachment leg parts 60, 60 due to the balance between the repulsive elastic forces of the outer peripheral urging rubbers 90, 90.

Moreover, in the present practical embodiment, on the distal end surfaces of the second attachment member 22 (the connecting parts 54, 54) in the direction of attachment to the bracket 14, distal end urging rubbers 92, 92 are provided so as to project radially outward (the far side in the direction of insertion into the connecting grooves 72, 72). As shown in the attached state of FIG. 7, the distal end urging rubbers 92, 92 are in contact with and pressed against the far wall faces 83, 83 formed by the far wall 68 of the bracket 14. As a result, the repulsive elastic force of the distal end urging rubbers 92, 92 is exerted on the connecting parts 54, 54, and acts such that the back surfaces of the engaging convex parts 86, 86 are pressed against the lower stepped faces 84a, 84a of the connecting grooves 72, 72. By so doing, the engaging convex parts 86, 86 of the connecting parts 54, 54 are held in contact with the lower stepped faces 84a, 84a of the connecting grooves 72, 72, thereby preventing rattling or the like.

Meanwhile, the fixedly supported state of the second attachment member 22 to the bracket 14 by attaching the pair of connecting parts 54, 54 to the pair of connecting grooves 72, 72 as described above is realized by the following procedure. Namely, as shown in FIGS. 16 to 18, the pair of connecting parts 54, 54 are inserted into the pair of connecting grooves 72, 72 from the near side toward the far side and pushed forward, and are press-fitted until the second attachment member 22 reaches an approximately housed position in the bracket 14.

First, as shown in FIG. 16, the pair of connecting parts 54, 54 of the second attachment member 22 are inserted into the pair of connecting grooves 72, 72 of the bracket 14 from the near-side opening part such that the mount main unit 12 is inserted from the opening portion of the installation space 66 of the bracket 14. At this time, the groove-inside upper faces 80, 80 of the respective connecting grooves 72, 72 gradually slope upward from the far side toward the near side, and the slope angle is made even larger particularly in proximity to the near-side end so as to have a guide taper (see FIGS. 7, 16D, etc.). Thus, the upper urging rubbers 82, 82 are prevented from being caught, and the insertion of the connecting parts 54, 54 into the connecting grooves 72, 72 is facilitated. Here, the outer peripheral urging rubbers 90, 90 and the upper urging rubbers 82, 82 may have a tapered shape in which the rubber thickness dimension is made small at the forward-side end in the direction of insertion, and gradually becomes thicker toward the backward side in the direction of insertion, for example. This configuration makes it possible to further facilitate the insertion of the connecting parts 54, 54 into the connecting grooves 72, 72.

Moreover, as shown in FIG. 17, the pair of connecting parts 54, 54 inserted into the pair of connecting grooves 72, 72 of the bracket 14 is pushed toward the far side. At that time, in the distal end portions in the direction of insertion of the connecting parts 54, 54, the lower faces of the engaging convex parts 86, 86 are overlapped on the groove-inside lower faces 76, 76 of the connecting grooves 72, 72 in metal-to-metal contact, and are guided to move toward the far side so as to be slid on the flat groove-inside lower faces 76, 76.

Figure 16A:
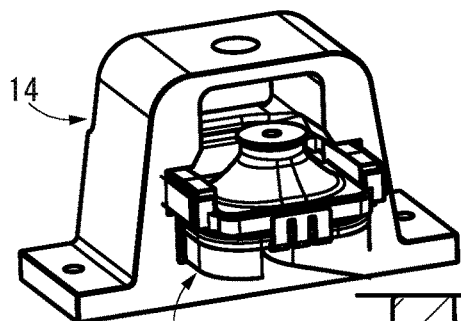
FIGS. 16A-16D are views suitable for explaining an initial state when the mount main unit shown in FIG. 8 is attached to the bracket shown in FIG. 13 from a lateral side.
Figure 16B:
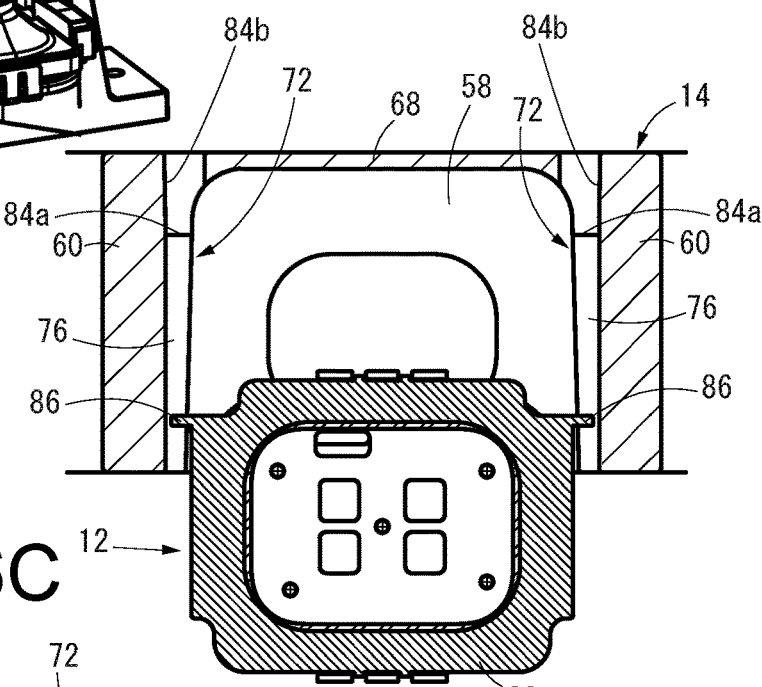
Figure 16C:
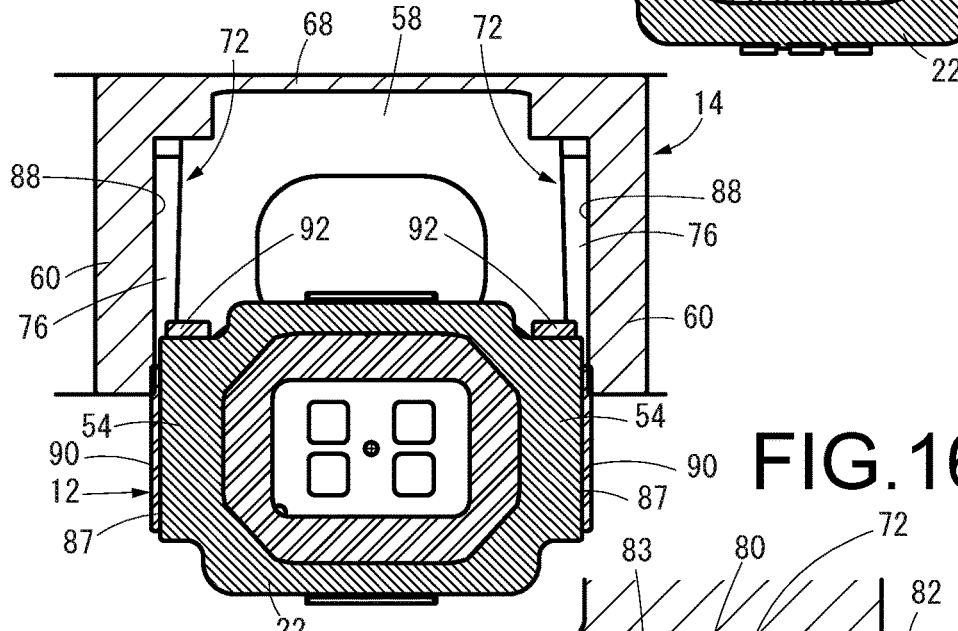
Figure 16D:
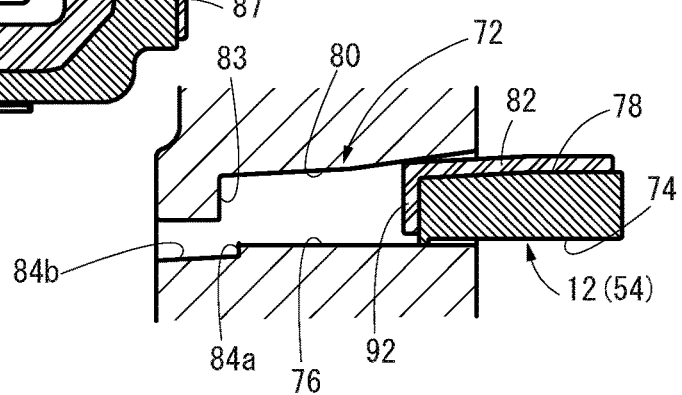
Figure 18A:
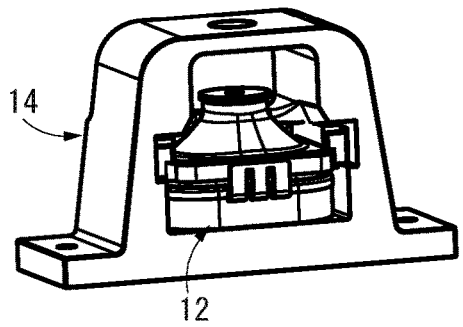
FIGS. 18A-18D are views suitable for explaining a final state when the mount main unit shown in FIG. 8 is attached to the bracket shown in FIG. 13 from the lateral side.
Figure 18B:
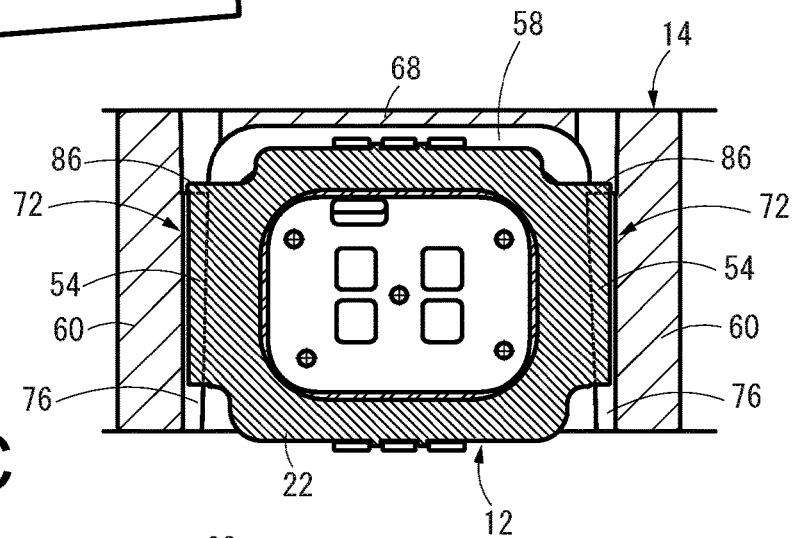
Figure 18C:
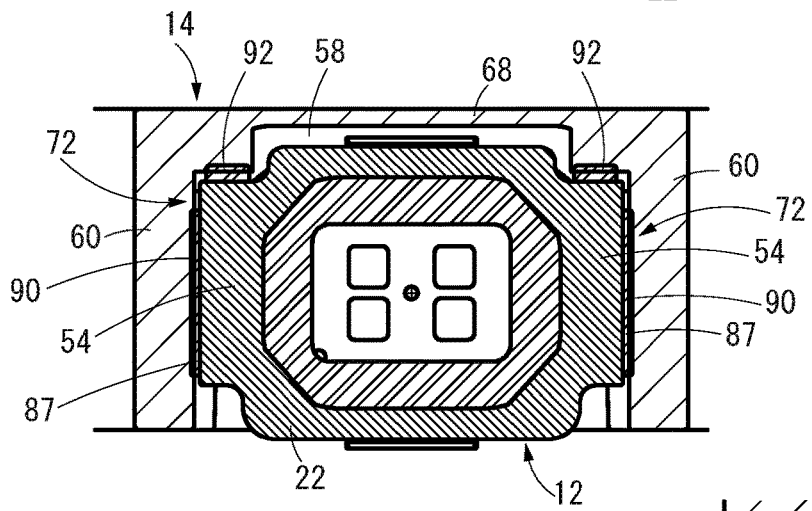
Figure 18D:
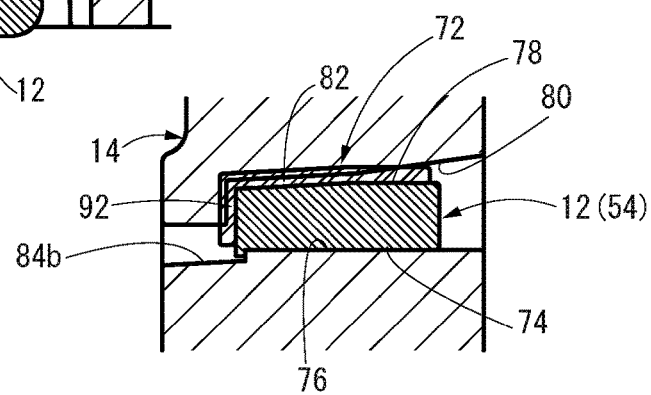

Here, in the connecting parts 54, 54 of the second attachment member 22, the concave surfaces 74, 74 located on the nearer side in the insertion direction than the engaging convex parts 86, 86 are preferably in a state of floating slightly upward from the groove-inside lower faces 76, 76 of the connecting grooves 72, 72 of the bracket 14 as shown in FIGS. 16D and 17D by exerting an upward lifting force together with the push-in force on the near-side end of the second attachment member 22, for example, so as to keep the connecting parts 54, 54 approximately horizontal. However, since the engaging convex parts 86, 86 of the connecting parts 54, 54 are located at the distal end, even if the lifting force exerted on the back end of the second attachment member 22 (the connecting parts 54, 54) is small, a moment force that directs the connecting parts 54, 54 upward is efficiently applied around the engaging convex parts 86, 86, thereby making it easy to keep the connecting parts 54, 54 approximately horizontal.

In the present practical embodiment in particular, the groove-inside upper faces 80, 80 of the pair of connecting grooves 72, 72 slope downward toward the far side, and the slope angle is further increased near the far-side ends of the groove-inside upper faces 80, 80. Thus, in the step of inserting the connecting parts 54, 54 into the connecting grooves 72, 72, a downward pressing force exerted on the connecting parts 54, 54 by the repulsive elasticity of the upper urging rubbers 82, 82 is large on the distal end side, but is hardly generated on the back end side. Therefore, a moment force in the direction of pressing down the connecting parts 54, 54 around the distal ends of the engaging convex parts 86, 86 (a clockwise moment force in FIGS. 16D and 17D) is kept low.

Furthermore, in the present practical embodiment, the upper urging rubbers 82, 82 of the connecting parts 54, 54 continuously project up to the distal end side beyond the distal end faces of the connecting parts 54, 54, and are connected to the distal end urging rubbers 92, 92 provided on the distal end faces of the connecting parts 54, 54. Then, in the step of inserting the connecting parts 54, 54 into the connecting grooves 72, 72, the portions of the upper urging rubbers 82, 82 that project up to the distal end side beyond the connecting parts 54, 54 come into contact with the groove-inside upper faces 80, 80 of the connecting grooves 72, 72, thereby causing a repulsive elasticity. This repulsive elasticity generates a moment force in the direction of lifting up the connecting parts 54, 54 around the distal ends of the engaging convex parts 86, 86 (a counterclockwise moment force in FIGS. 16D and 17D). As a result, the moment force in the direction of pressing down the connecting parts 54, 54 around the distal ends of the engaging convex parts 86, 86 caused by the repulsive elasticity of the upper urging rubbers 82, 82 provided on the upper faces of the connecting parts 54, 54 (the clockwise moment force in FIGS. 16D and 17D) can be kept even lower, thereby making it still easier to keep the connecting parts 54, 54 approximately horizontal.

Then, as shown in FIG. 18, when the pair of connecting parts 54, 54 are pushed to the farthest side along the pair of connecting grooves 72, 72 of the bracket 14, the engaging convex parts 86, 86 formed at the distal ends of the pair of connecting parts 54, 54 reach the engaging concave parts 84b, 84b formed in the pair of connecting grooves 72, 72, so that the engaging convex parts 86, 86 are off the distal ends of the groove-inside lower faces 76, 76 and drop into the engaging concave parts 84b, 84b. Accordingly, the entire second attachment member 22 including the connecting parts 54, 54 falls downward by the height of the downward projection of the stepped convex parts 86, 86 to move.

As a result, the attached state shown in FIGS. 1 to 7 can be realized as described above, and the lower faces (the concave surfaces) 74, 74 of the pair of connecting parts 54, 54 come into metal-to-metal contact with the groove-inside lower faces 76, 76 of the pair of connecting grooves 72, 72 and are held in a pressed state, while the back surfaces of the engaging convex parts 86, 86 of the pair of connecting parts 54, 54 come into metal-to-metal contact with the lower stepped faces 84a, 84a of the pair of connecting grooves 72, 72 and are held in a pressed state.

As is apparent from the above description, in such an attached state, the second attachment member 22 is positioned with respect to the bracket 14 in metal-to-metal contact in the vertical direction, and is also positioned in metal-to-metal contact in the front-back direction. This makes it possible to position and support the second attachment member 22 with respect to the bracket 14 with high accuracy and a high load bearing capability.

Besides, when the second attachment member 22 is attached to the bracket 14, the engaging convex parts 86, 86 of the pair of connecting parts 54, 54 are guided so as to slide on the flat groove-inside lower faces 76, 76 of the pair of connecting grooves 72, 72, and the second attachment member 22 moves approximately in parallel to be attached. Thus, during the attachment operation, the movement of climbing over the projection or the like can be unnecessary for the pair of connecting parts 54, 54, and difficult operations required by climbing over the projection or the like are not necessary. Additionally, a large temporary tilt of the second attachment member 22 with respect to the bracket 14 due to climbing over the projection or the like is avoided. This makes it possible to easily attach the second attachment member 22 to the bracket 14, as well as to avoid partial or temporary deterioration in sealing performance between the second attachment member 22 and the closure member 30, liquid leakage, and the like during attachment of the second attachment member 22 to the bracket 14 due to, for example, the entire mount main unit 12 tilting to cause the closure member 30 engaged by hooking with the second attachment member 22 to locally and strongly come into contact with the base part 58 of the bracket 14, or the like.

Moreover, in the present practical embodiment, the lower stepped face 84a of the connecting groove 72, which constitutes the detent engager of the bracket 14, is formed at the far-side end of the connecting groove 72 in the direction of insertion of the connecting part 54. This makes it possible to shorten the length of the engaging concave part 84b serving as a hole for demolding the partitioned mold component inserted by penetrating the far wall 68 of the bracket 14, and hence the length of the said partitioned mold component. Thus, sufficient member strength and durability of the partitioned mold component can be advantageously obtained, as well as the bracket 14 provided with the engaging concave part 84b including the lower stepped face 84a can be easily and stably molded.

While the present disclosure has been described in detail hereinabove in terms of the practical embodiments, the disclosure is not limited by the specific description thereof. For example, the upper urging rubber 82, the outer peripheral urging rubber 90, the distal end urging rubber 92, and the like may be integrally formed with the main rubber elastic body 24 or may be formed separately. Further, the upper urging rubber 82, the outer peripheral urging rubber 90, the distal end urging rubber 92, and the like may be integrally formed with each other, or may be formed separately.

The specific structure of the bracket shown in the preceding practical embodiment is merely exemplary, and as long as the connecting groove is provided, the mounting structure to the vehicle body, presence or absence and the specific structure of the top plate part and the bottom plate part, and the like can be modified appropriately.

Also, the method of attaching the mount main unit 12 to the bracket 14 by the lateral insertion shall not be construed as limited to the above-described exemplary description. For example, in the insertion step as shown in FIG. 17B, it would also be acceptable to insert a spacer member into a gap between the concave surface 74 of the connecting part 54 and the groove-inside lower face 76 of the connecting groove 72 from the near side in the direction of insertion (the right side in FIG. 17B) and lift up the near-side portion of the connecting part 54, thereby pushing in the connecting part 54 to the far side while keeping the connecting part 54 approximately horizontal.

Furthermore, the preceding practical embodiment described an example in which the present disclosure is implemented in an engine mount. However, the present disclosure is not limited to implementation in engine mounts, and may be implemented in various types of liquid-filled vibration damping devices such as body mounts, cab mounts, and the like.

What is claimed is:

1. A liquid-filled vibration damping device comprising:
   a vibration-damping device main unit comprising:
      a first attachment member and a second attachment member that are vertically remote from each other and are elastically connected by a main rubber elastic body, the second attachment member comprising a pair of connecting parts provided on opposite sides, and
      a closure member overlapped on and locked to the second attachment member from below with a seal member sandwiched therebetween to define and seal a liquid chamber; and
   a bracket comprising opposite leg parts, the opposite leg parts comprising a pair of connecting grooves provided on opposed inner faces of the opposite leg parts, the vibration-damping device main unit being attached to the bracket from a lateral side by the pair of the connecting parts being inserted into the pair of the connecting grooves, wherein
   the pair of the connecting parts of the second attachment member and the pair of the connecting grooves of the bracket are all made of metal,
   upper urging rubbers are provided on respective upper faces of the pair of the connecting parts while the metal is exposed on lower faces of the pair of the connecting parts, and the pair of the connecting parts are pressed against groove-inside lower faces of the pair of the connecting grooves in metal-to-metal contact by elastic reaction forces due to the upper urging rubbers being in contact with groove-inside upper faces of the pair of the connecting grooves,
   engaging convex parts are provided on the respective lower faces of the pair of the connecting parts, the engaging convex parts being located at far-side ends in a direction of insertion into the pair of the connecting grooves and protruding downward, while engaging concave parts are provided on the respective groove-inside lower faces of the pair of the connecting grooves at locations corresponding to the engaging convex parts, and
   detent engagers that prevent dislodgment of the pair of the connecting parts inserted in the pair of the connecting grooves are constituted in metal-to-metal contact by the pair of the connecting parts being inserted into the pair of the connecting grooves and the engaging convex parts of the connecting parts moving toward a far side in the direction of insertion on the groove-inside lower faces of the pair of the connecting grooves to enter the engaging concave parts of the pair of the connecting grooves to be engaged.

2. The liquid-filled vibration damping device according to claim 1, wherein the bracket further comprises a lower support part that is in contact with the closure member of the vibration-damping device main unit from below and supports the closure member with the seal member sandwiched between the closure member and the second attachment member supported by the pair of the connecting grooves of the bracket.

3. The liquid-filled vibration damping device according to claim 1, wherein outer peripheral urging rubbers are provided on respective outer peripheral surfaces of the pair of the connecting parts, and the outer peripheral urging rubbers are in contact with respective groove-inside bottom faces of the pair of the connecting grooves.

4. The liquid-filled vibration damping device according to claim 1, wherein
   left and right opposite side portions of the second attachment member include flat lower faces, and concave surfaces are formed on respective outer peripheral end edges of the flat lower faces of the left and right opposite side portions, the concave surfaces extending linearly in a front-back direction from a backward-side end toward a forward side in the direction of insertion into the pair of the connecting grooves,
   the pair of the connecting parts are constituted by the left and right opposite side portions where the respective concave surfaces are formed, and the concave surfaces comprise exposed surfaces of the metal that are pressed against the groove-inside lower faces of the pair of the connecting grooves in metal-to-metal contact, and
   the concave surfaces do not reach respective forward-side ends on the flat lower faces of the left and right opposite side portions, and the engaging convex parts are constituted by portions where the concave surfaces are not formed on the forward side with respect to the concave surfaces.

5. The liquid-filled vibration damping device according to claim 1, wherein a distal end urging rubber is provided on a distal end face of the second attachment member in a direction of attachment from the lateral side to the bracket and is in contact with the bracket in the direction of attachment.

6. The liquid-filled vibration damping device according to claim 1, wherein the groove-inside upper faces of the pair of the connecting grooves have a guide taper at least in opening portions on a side from which the pair of the connecting parts are inserted, the guide taper sloping to increase a groove width from the far side toward an opening side in the direction of insertion of the pair of the connecting parts.

7. The liquid-filled vibration damping device according to claim 1, wherein
   the bracket includes a pair of support leg parts that are opposed to each other with a prescribed distance therebetween,
   the pair of the connecting grooves are provided on opposed inner faces of the pair of the support leg parts,
   a far wall is provided on a side opposite to a side to which the vibration-damping device main unit is attached between the pair of the support leg parts, and
   the engaging concave parts provided at the far-side ends of the pair of the connecting grooves are formed such that the engaging concave parts penetrate the far wall and extend to the far side.

* * * * *